United States Patent [19]

Kramer et al.

[11] Patent Number: 5,552,952
[45] Date of Patent: Sep. 3, 1996

[54] DETECTION AND ISOLATION CIRCUIT FOR A FAILED BRIDGE POWER RECTIFIER AND AN ELECTRICAL SYSTEM EMPLOYING SAME

[75] Inventors: Kenneth C. Kramer; Roy S. Baker, both of Rockford, Ill.

[73] Assignee: Sundstrand Corporation, Rockford, Ill.

[21] Appl. No.: 327,759

[22] Filed: Oct. 21, 1994

[51] Int. Cl.⁶ .................................................. H02H 3/00
[52] U.S. Cl. ................................ 361/86; 361/47; 361/52
[58] Field of Search ............................. 363/50, 52, 53, 363/55, 56, 58; 361/20, 21, 42, 44, 47, 48, 52, 62, 63, 64, 65, 76, 78, 86, 88

[56] References Cited

U.S. PATENT DOCUMENTS

| | | | |
|---|---|---|---|
| 3,986,103 | 10/1976 | Frankenberg et al. | 363/50 |
| 4,376,968 | 3/1983 | Wueschinski et al. | 363/54 |
| 4,442,396 | 4/1984 | Hucker | 361/21 |
| 4,475,150 | 10/1984 | D'Atre et al. | 363/51 |
| 4,620,272 | 10/1986 | Fulton et al. | 363/53 |

Primary Examiner—Jeffrey A. Gaffin
Assistant Examiner—Ronald W. Leja
Attorney, Agent, or Firm—Jeffery J. Makeever

[57] ABSTRACT

A protection circuit for a bridge rectifier having a plurality of ac inputs coupled to a plurality of line voltages, and a dc output, comprises monitoring circuits coupled to the line voltages for monitoring the line voltages and generating sequential line-to-line voltage signals, conduction circuits coupled to the monitoring circuits for conducting that portion of each of the sequential line-to-line voltage signals having a given polarity, the conducting circuits generating sequential half wave voltage signals having a given polarity magnitude, and discriminating circuits coupled to the conducting circuits for discriminating a faulted rectifier by monitoring the given polarity magnitude of each of the sequential half wave voltage signals. The discriminating circuits generate a protection signal in response to one of the magnitudes of the sequential half wave voltages signals being less than a threshold.

14 Claims, 7 Drawing Sheets

DETECTION AND ISOLATION CIRCUIT FOR A FAILED BRIDGE POWER RECTIFIER AND AN ELECTRICAL SYSTEM EMPLOYING SAME

FIELD OF THE INVENTION

The instant invention is related to protection circuits, and more particularly to a detection and isolation circuit capable of sensing a failed diode in a bridge power rectifier circuit and a variable speed constant frequency (VSCF) electric power generating system employing same.

BACKGROUND ART

Electrical power generation and distribution systems typically employ various means for protecting both the distribution equipment (e.g., generators, controllers, distribution wiring and feeders, etc.) and the utilization equipment connected thereto (e.g., computers, lighting systems, fans, motors, control units for other systems, etc.) from faults which could otherwise cause extensive damage. Protective functions such as over voltage, under voltage, over frequency, under frequency, etc., are designed so that the utilization equipment are not damaged by a failure within the controls or equipment which regulates the power produced by the electrical system. At the same time, functions such as over current, shorted generator diode, differential current, etc., protect the generation equipment from damage which may result as a result of failures within the generators, along the distribution feeders, or even within the utilization equipment, e.g. short circuits, open phase wires, etc.

Of these protective functions, the differential current protection is particularly important. A differential current fault includes short circuits, high impedance to ground faults, and line-to-line faults which occur somewhere along the feeders between the generator and the utilization equipment. These faults are of particular importance because at least some of the current injected into the feeders by the generator is going to a fault and not to the loads. This differential current may result in fire or other damage. For many ground based electrical systems, protection against this type of fault is provided by installing circuit breakers or like devices at the input to the distribution system which go open circuit, or "blow", when one of these faults occur due to the substantially increased current flow along the feeders. The typical time for actuation of one of these devices is related to the amount of current flowing, and may be as long as 10 seconds depending on the application. For some high impedance faults, however, the threshold current level may never be reached, and the fault could exist indefinitely, thus reducing the efficiency and safety of the system.

For airborne electrical systems, however, the electrical feeders often traverse fuel tanks and pass through volatile areas. Allowing a short circuit or other differential fault to last for such time frames as are allowed in ground based systems could result in fire, explosion, and crash of the aircraft. To protect against such disasters, airborne electric power generation and distribution systems utilize a much more sophisticated approach to detect and isolate these types of faults. The differential current protection system used on aircraft works under the simple principle that what goes in, must come out. For electrical systems the principle states that the amount of current injected into a feeder must equal the amount of current supplied to the loads (the utilization equipment). The amount of current generated at the source is monitored and compared to the amount of current supplied to the loads. Any difference between these two values indicates that a fault exists somewhere in between. Upon detection of such a fault, the system controller can isolate the fault and reconfigure the system to compensate within 20 to 120 milliseconds.

Figure 1:
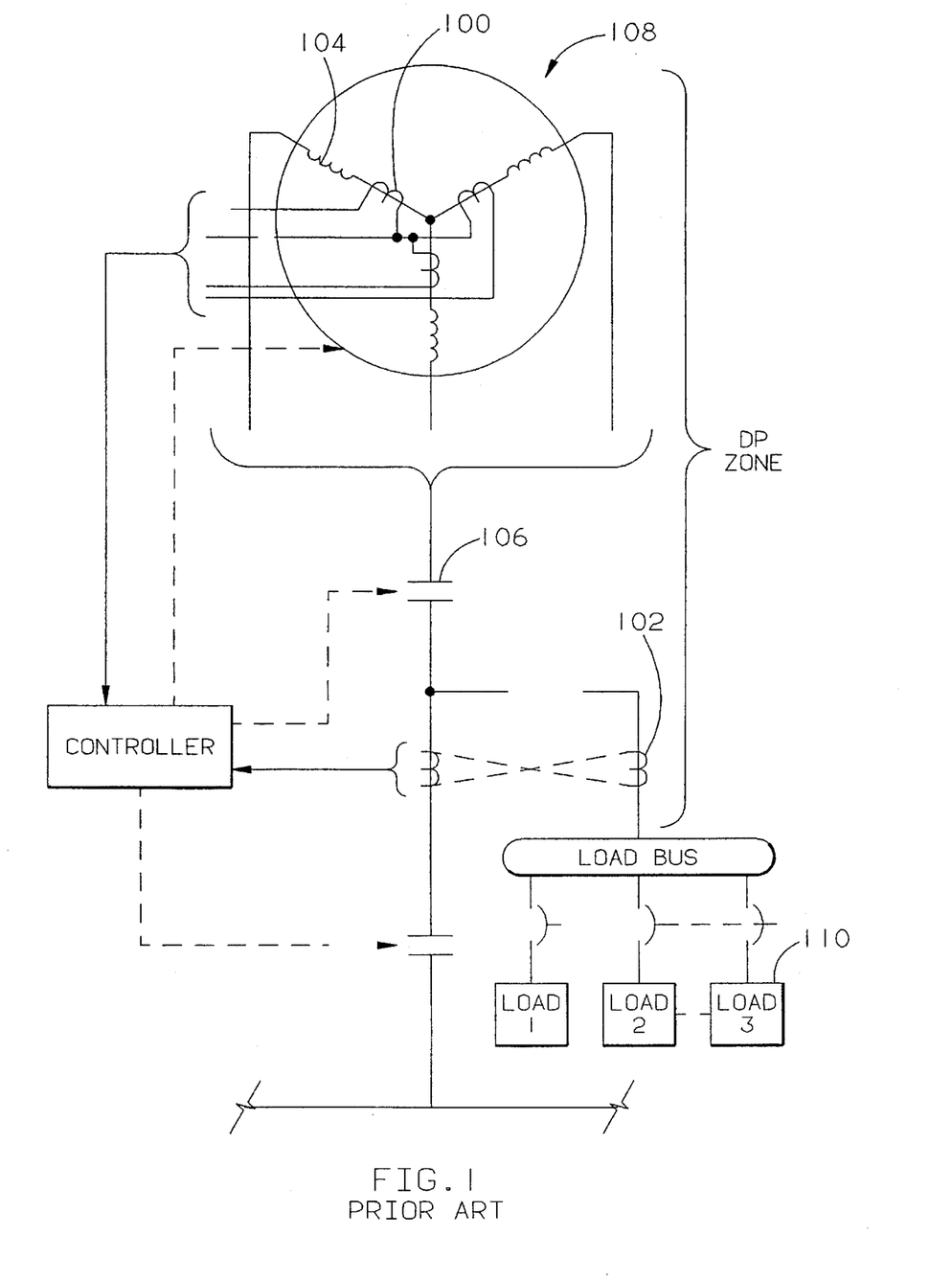
FIG. 1 is a single line diagram of a single channel of a typical aircraft electric power generating system illustrating the differential protection (DP) zones.

As shown in FIG. 1, the input monitoring devices 100 and the output monitoring devices 102, e.g. current transformers, define a differential protection (DP) zone. Protected within this DP zone for a typical 400 Hz system are the generator windings 104, main line contactors 106, terminal connectors, etc. Inclusion of the entire system from the generator 108 to the loads 110 is possible because the current generated by the generator 108 is delivered to the loads 110 without conversion, i.e. the power generated is 115 Vac, 400 Hz and the power used is 115 Vac, 400 Hz.

Figure 2:
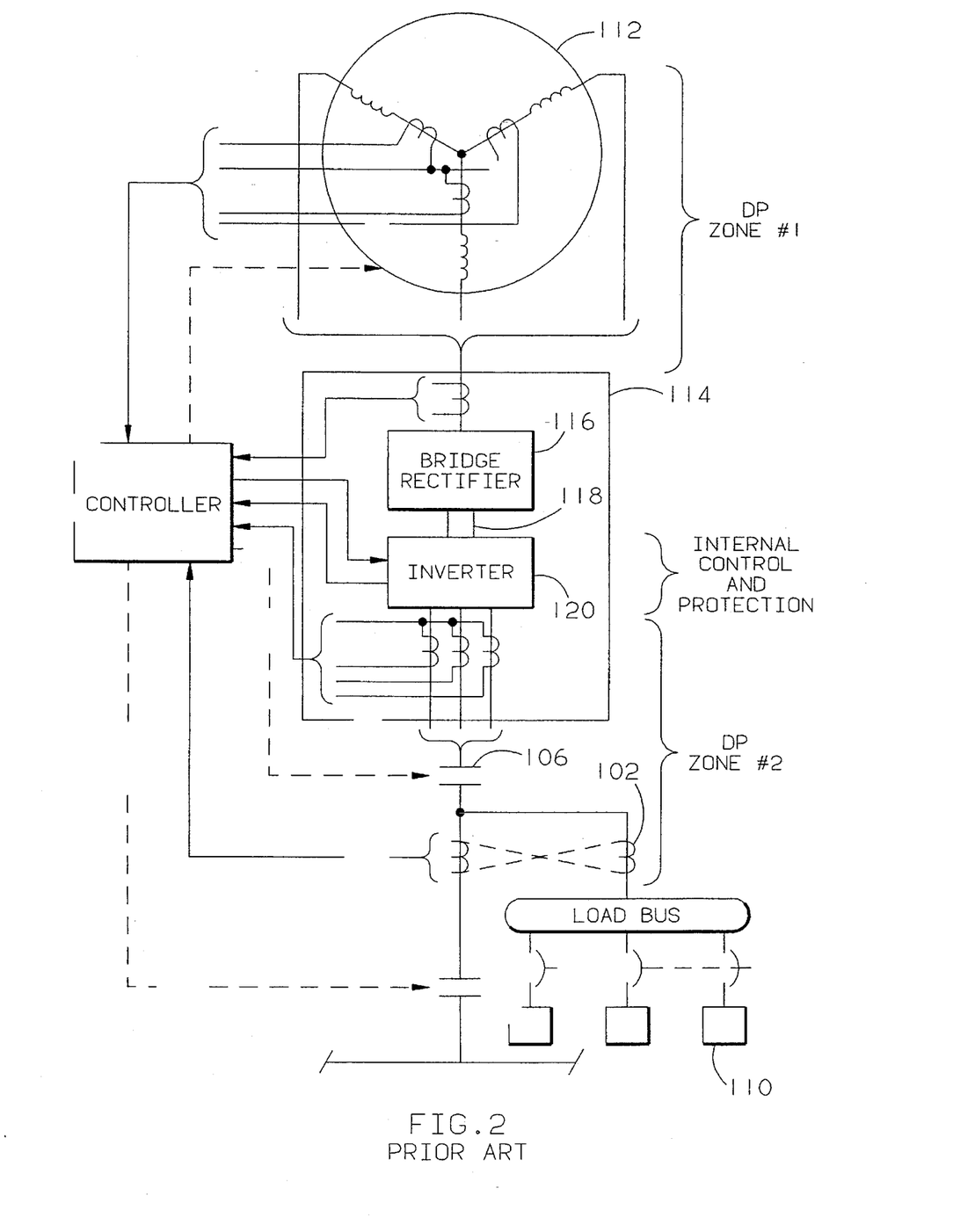
FIG. 2 is a single line diagram of a single channel of a variable speed constant frequency (VSCF) electric power generating system illustrating the differential protection (DP) zones.

As shown in FIG. 2, another topology system exists, however, wherein the power generated is converted prior to delivery to the loads. This type of system makes it difficult to compare the current generated by the generator to that which is ultimately delivered to the loads due to the varying efficiencies of the conversion equipment under the various loading conditions. For this reason, DP zones are established for each stage of power conversion. A first DP zone exists from the generator 112 to the converter 114, a second from the converter 114 to the loads 110. Unfortunately, these DP zones do not overlap, and therefore cannot sense faults within the converter 114.

A popular converter topology used for airborne applications is known as a dc link system. This topology transforms the input variable frequency electric power generated by the wild frequency generator 112 into dc electric power via an input bridge rectifier 116. This dc electric power is then input via a dc link 118 to a switching network 120 which produces constant frequency electric power for use by the utilization equipment 110. Although the sophisticated control of the switches can detect and isolate faults which occur at its stage of conversion (dc to constant frequency ac conversion), no system of protection could detect and isolated a fault occurring at the other stage of conversion within the converter (wild frequency ac to dc conversion). The result is that a short circuit across one of the rectifiers in the ac to dc conversion stage could go undetected, depending on generator speed and loading conditions, resulting in reduced safety and efficiency, and potential damage to the converter as well as to the aircraft. The likelyhood of detection is reduced at high generator speeds and low loads, which is the normal operating mode for back-up and emergency power systems. The present invention is directed to overcoming this problem.

SUMMARY OF THE INVENTION

It is the principle objective of the instant invention to provide a new and improved detection and isolation circuit. More specifically it is the principle objective of the instant invention to provide a new and improved detection and isolation circuit for a failed bridge power rectifier circuit whereby a short circuited diode may be detected and the fault isolated to protect the system from further damage as a result of the failed diode.

In a preferred embodiment of the instant invention, a protection circuit for a bridge rectifier having a plurality of ac inputs coupled to a plurality of line voltages, and a dc output, comprises monitoring circuits coupled to the line voltages for monitoring the line voltages and generating sequential line-to-line voltage signals, conduction circuits coupled to the monitoring circuits for conducting that portion of each of the sequential line-to-line voltage signals having a given polarity, the conducting circuits generating sequential half wave voltage signals having a given polarity magnitude, and discriminating circuits coupled to the conducting circuits for discriminating a faulted rectifier by monitoring the given polarity magnitude of each of the sequential half wave voltage signals. The discriminating circuits generate a protection signal in response to one of the magnitudes of the sequential half wave voltages signals being less than a threshold.

In an alternate embodiment of the instant invention, an electric power generating system comprises a generator, having a poly-phase ac output, being drivably coupled to a prime mover whereby a first poly-phase ac electrical waveform having a frequency component which varies with speed is generated on the poly-phase output. An electric power converter is electrically coupled to the poly-phase output and converts the first poly-phase ac electrical waveform to a second poly-phase ac electrical waveform having a controlled frequency component which may be varied independent of generator speed. In this embodiment, the converter comprises an input bridge rectifier which converts the first waveform into a dc waveform on a dc link, and a switching network which then converts the dc waveform into the second waveform. The converter further comprises a circuit which detects and isolates a failure in the input bridge rectifier. This detection and isolation circuit de-energizes the generator in response to the fault.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 3:
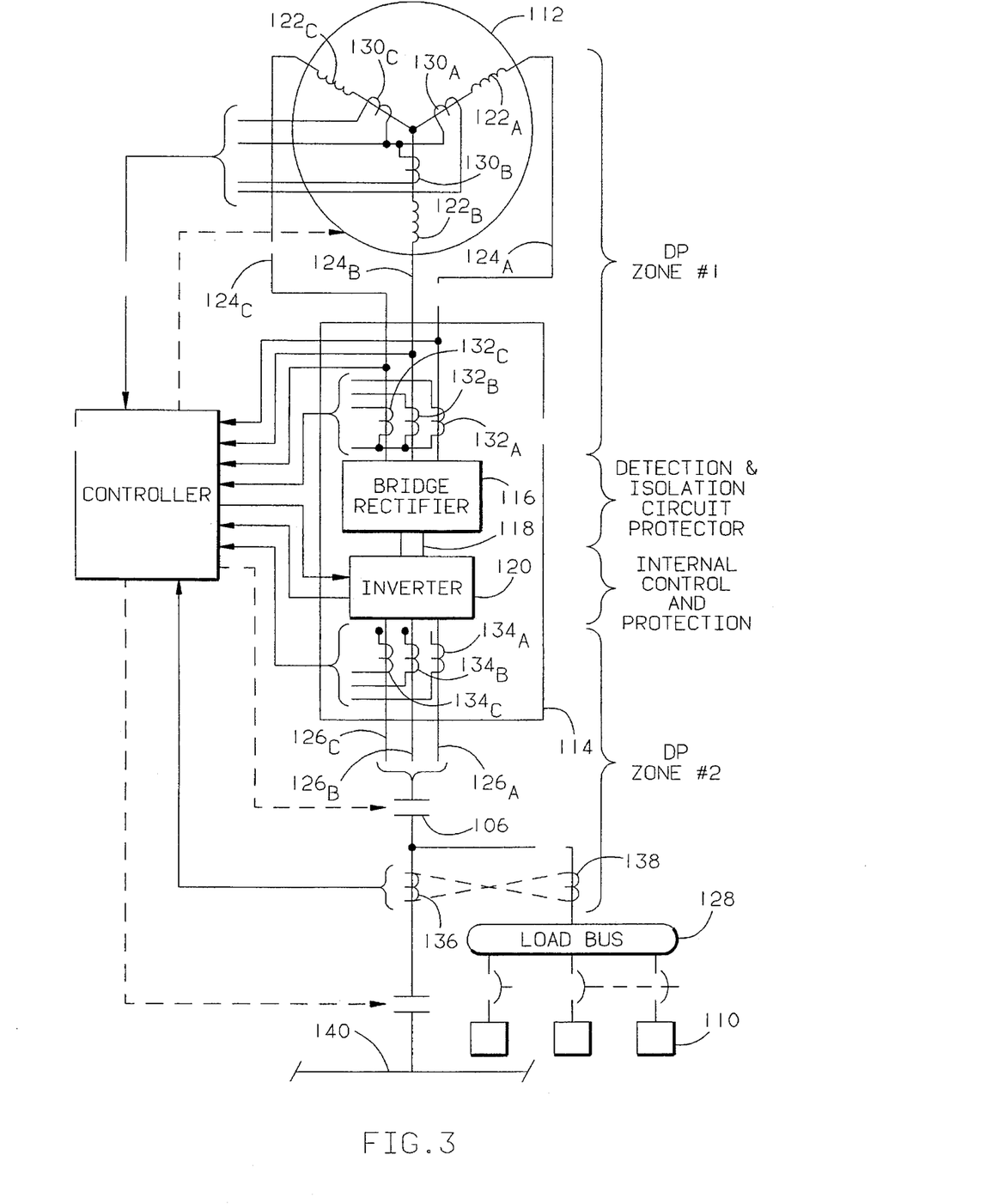
FIG. 3 is a single line diagram of a single channel of a variable speed constant frequency (VSCF) electric power generating system of the instant invention.

A preferred embodiment of the instant invention, as illustrated in FIG. 3, comprises a variable speed generator 112 having a poly-phase ac output (shown schematically as phase windings $122_A$, $122_B$, and $122_C$). The generator is drivably coupled to a prime mover, such as the aircraft engine (not shown), and produces a first poly-phase ac electrical waveform having a frequency component which varies as a function of the generator speed. The output of the generator 112 is coupled by feeders $124_A$, $124_B$, and $124_C$ to electric power conversion means, such as converter 114, for converting the first poly-phase ac electric waveform to a second poly-phase ac electric waveform on feeders 126A, 126B, and 126C. This second waveform has a controlled frequency component which may be varied independent of generator speed by varying the switching frequency of the converter 114. This constant frequency output is coupled through main line contactor 106 to a load bus 128, to which are coupled the various system loads 110.

In the preferred embodiment of the instant invention, the converter 114 comprises an input rectifier means 116 for converting the first waveform into a dc waveform on the dc link 118. A switching network means 120 is coupled to the dc link 118 and converts the dc waveform to the second poly-phase constant frequency waveform on feeders $126_A$, $126_B$, and $126_C$. Differential protection for this system is provided by several zones of protection. The start of DP zone #1 is defined by the generator current transformers $130_A$, $130_B$, $130_C$ and its end by current transformers $132_A$, $132_B$, $132_C$. This zone includes generator windings $122_A$, $122_B$, $122_C$, and feeders $124_A$, $124_B$, $124_C$. DP zone #2 is defined by current transformers $134_A$, $134_B$, $134_C$ and current transformer pairs 136 and 138 for each phase. These pairs are cross coupled, thereby canceling any current delivered by the tie bus 140. Protection from failures within the switching network means 120 is provided by its own sophisticated control and protection. Protection against failures within the input rectifier means 116 is provided by detecting and isolating means which will de-energize the generator in response to a fault.

Figure 4:
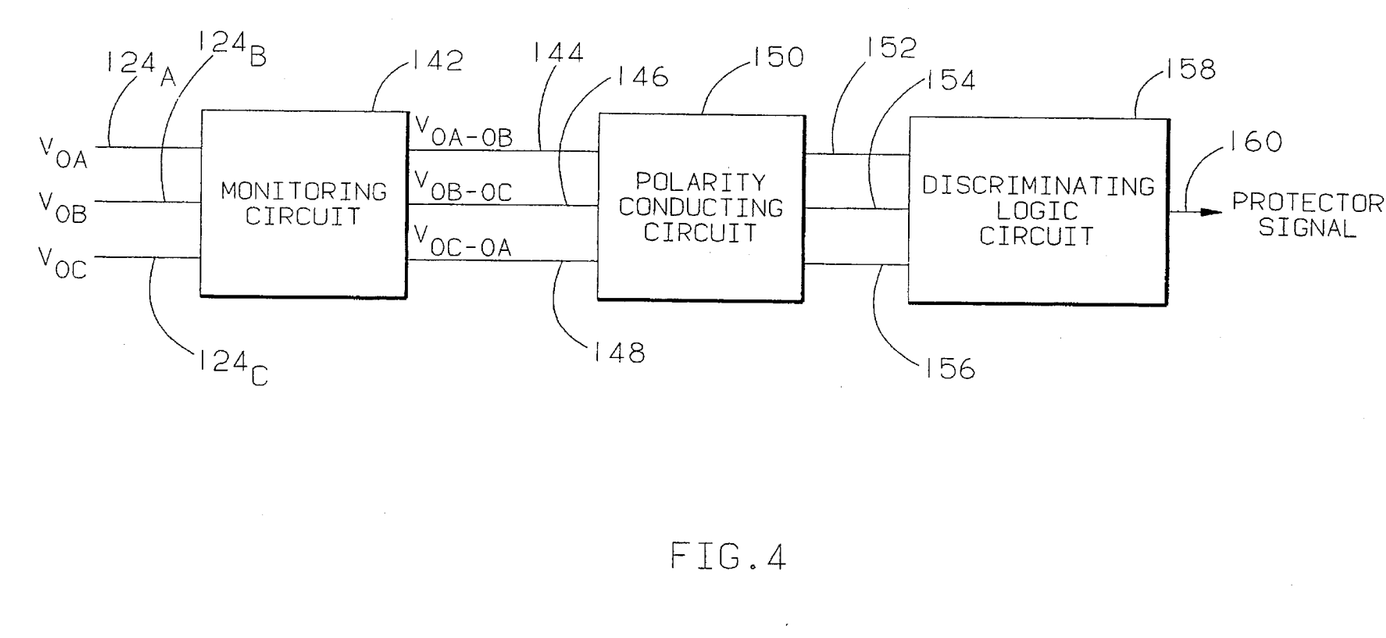
FIG. 4 is a circuit block diagram of an embodiment of the detection and isolation circuit of the instant invention.

As shown in FIG. 4, the detecting and isolating means comprises a monitoring means or circuit 142 coupled to each phase 124A, 124B, 124C of the first poly-phase ac waveform for monitoring the phase voltages. This monitoring circuit 142 generates sequential phase-to-phase voltage signals on lines 144, 146, 148 therefrom. Polarity conducting means or circuit 150 is coupled to the monitoring circuit 142 and conducts that portion of each of the sequential phase-to-phase voltage signals having a given polarity, e.g. only the positive portions. The conducting circuit 150 generates sequential half wave voltage signals having the given polarity magnitude on lines 152, 154, 156. Discriminating logic means or circuit 158 is coupled to the conducting circuit 150 and discriminates a faulted input bridge rectifier 116 (see FIG. 3) by monitoring the given polarity magnitude of each of the sequential half wave voltage signals on lines 152, 154, 156. The discriminating circuit 158 generates a protection signal on line 160 in response to one of the magnitudes being less than a given threshold. It should be noted that the use of the term circuit is generic only and will be recognized by one skilled in the art as allowing for implementation in hardware or software depending on the particular application.

Figure 5:
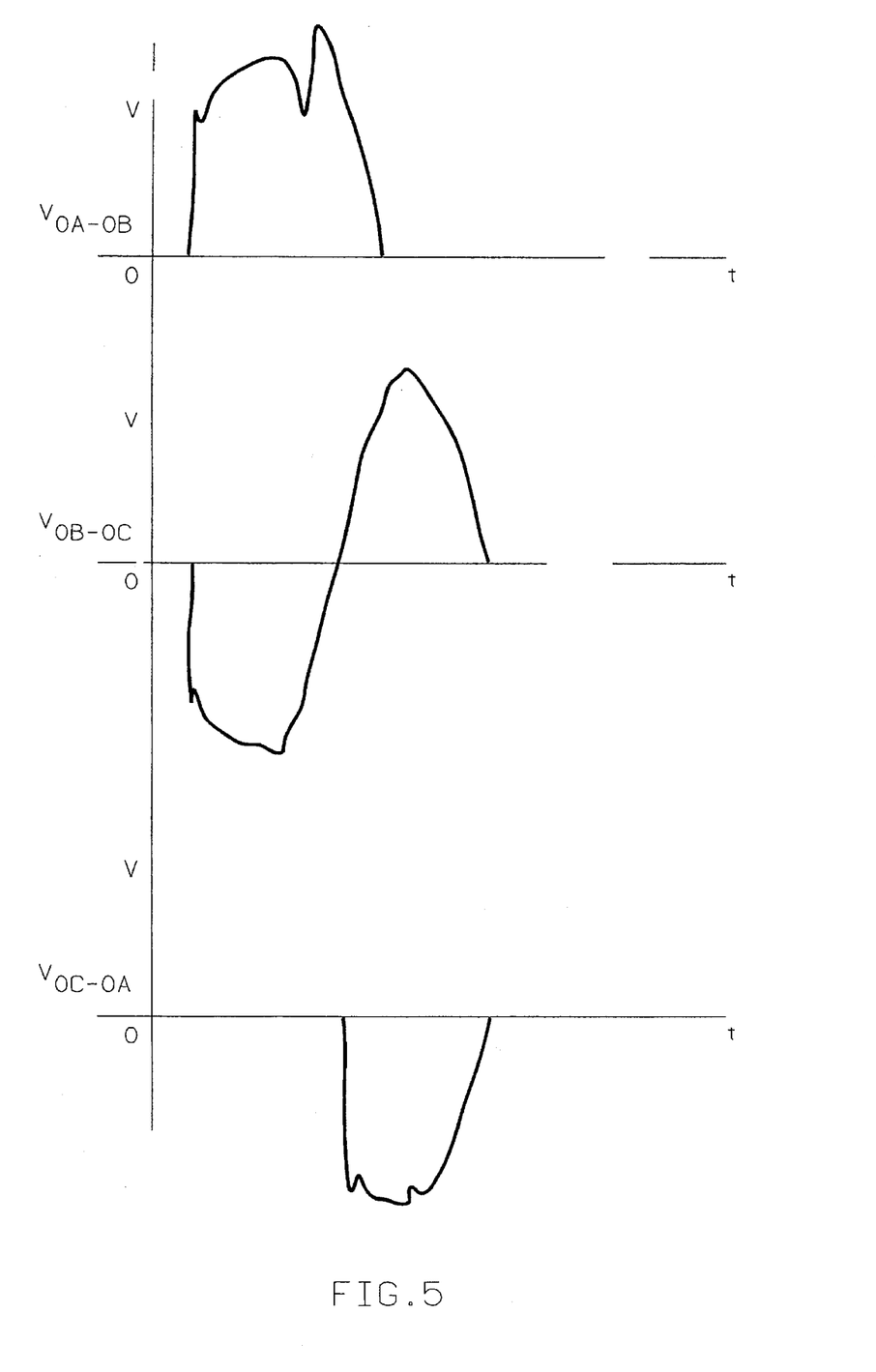
FIG. 5 is a waveform diagram illustrating the line-to-line voltages during a shorted rectifier fault.

FIG. 5 illustrates the line-to-line voltage waveforms present on lines 144, 146, 148 (see FIG. 4) during a failed input bridge rectifier condition. The output of the polarity conducting circuit 150, if the given polarity is set to positive, during this condition will be a positive half wave on line 152, a positive half wave on line 154, and zero voltage on line 156. Under these conditions the discriminating logic circuit 158 will generate the protection signal on line 160 to de-energize the generator to isolate the failed input bridge rectifier 116 of FIG. 3.

Figure 6:
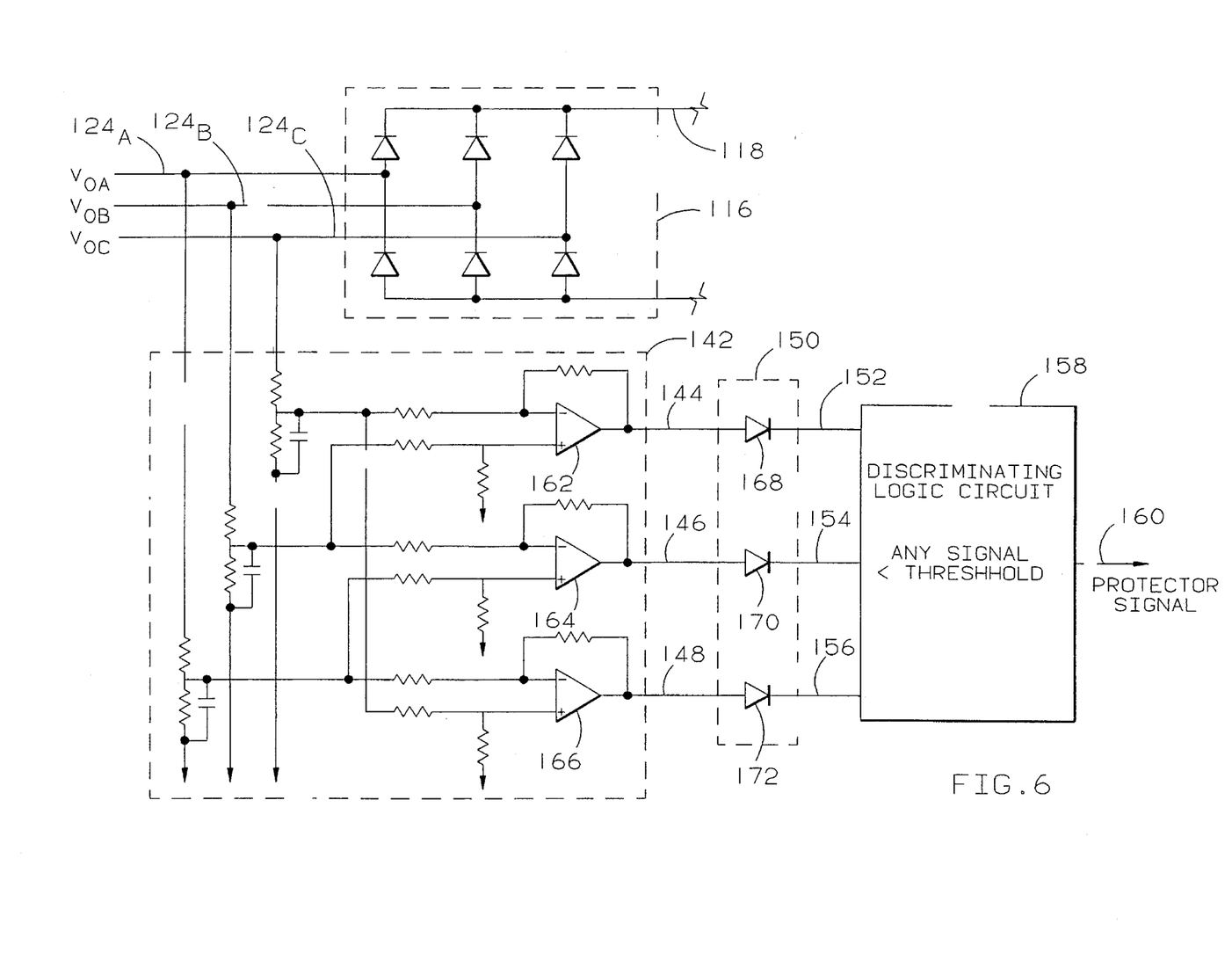
FIG. 6 is a schematic diagram of an embodiment of the detection and isolation circuit of the instant invention.

As illustrated in FIG. 6, the phase voltages produced by the generator on lines $124_A$, $124_B$, $124_C$ are coupled both to the input bridge rectifier means, which comprises a diode bridge in this exemplary embodiment to rectify the three phase voltages to a dc voltage on the dc link 118, and to the monitoring circuit 142. This monitoring circuit 142 comprises differential summing amplifiers 162, 164, 166, each of which monitor two phase voltages and produce a single phase-to-phase voltage output on lines 144, 146, 148 which are coupled to the polarity conducting circuit 150. This polarity conducting circuit 150 passes only a single polarity, and comprises diodes 168, 170, 172. In this exemplary embodiment the diodes 168, 170, 172 are coupled with their anodes coupled to the monitoring circuit 142 and their cathodes coupled to the discriminating logic circuit 158 to pass only the positive portions of the phase-to-phase voltage waveforms on lines 144, 146, 148. If the diodes 168, 170, 172 were coupled in the opposite direction (with their cathodes coupled to lines 144, 146, 148 and their anodes coupled to lines 152, 154, 156) this polarity conducting circuit would pass only the negative portion of the phase-to-phase waveforms. As shown, however, the positive portion of the phase-to-phase waveforms are passed via lines 152, 154, 156 to the discriminating logic circuit 158 which determines from these waveforms the presence of a fault in the input bridge rectifier circuit 116. Specifically, the discriminating logic circuit 158 monitors the positive half-wave signals and generates a protection signal on line 160 if any one of the magnitudes of these positive half-wave signals is less than a given threshold.

Figure 7:
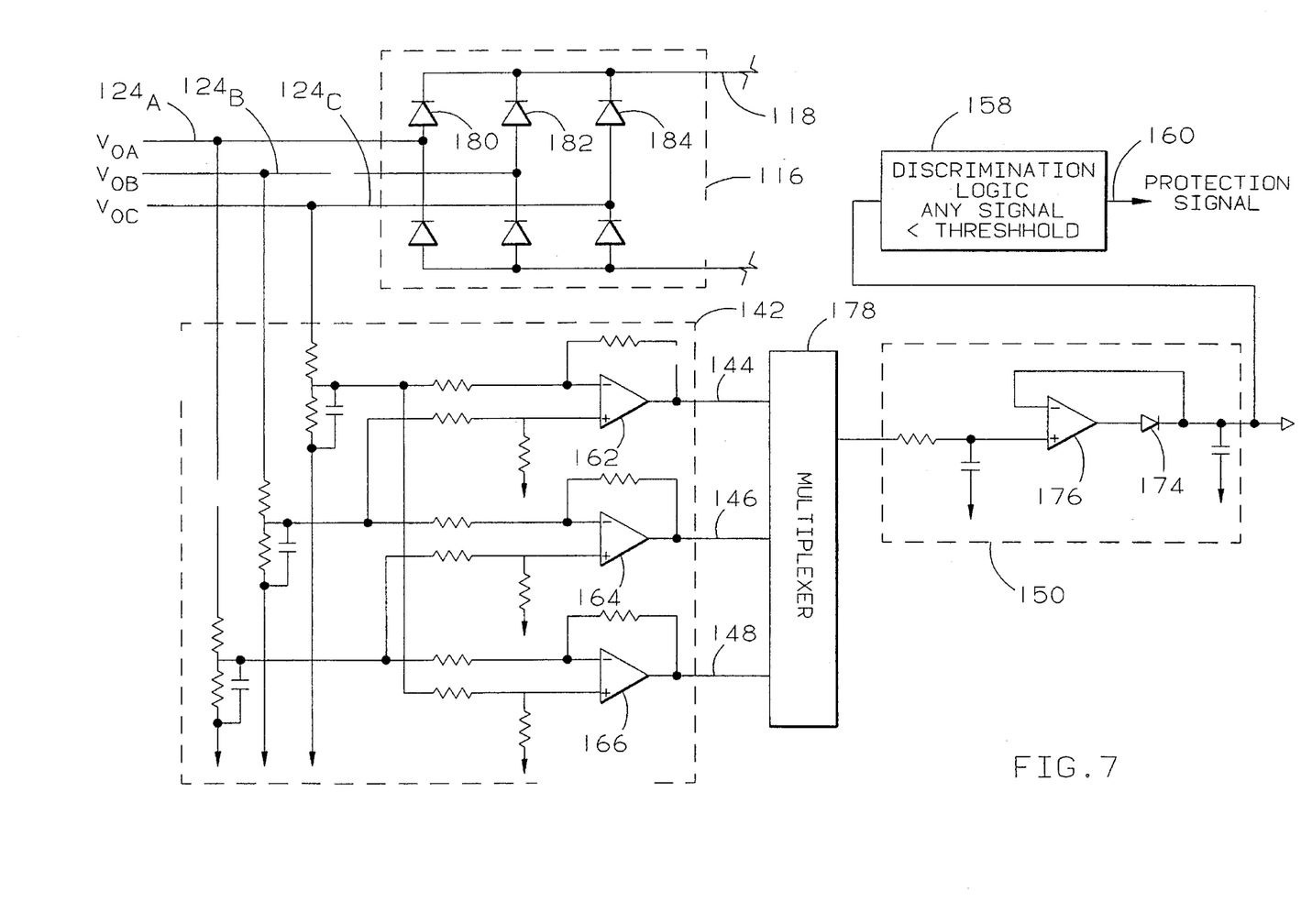
FIG. 7 is a schematic diagram of a further embodiment of the detection and isolation circuit of the instant invention.

In a highly preferred embodiment of the instant invention, as shown in FIG. 7, an ideal diode circuit comprising a diode 174 and an operational amplifier 176 replaces the diodes 168, 170, 172 (see FIG. 6) in the polarity conducting circuit 150 to eliminate the diode voltage drop from this stage of the circuit. Additionally, the addition of a multiplexer 178 allows only one ideal diode to be used in the polarity discriminating circuit 150. In this way, the discriminating logic circuit 158 sequentially monitors the waveform magnitudes to discriminate the presence of a fault. This embodiment of the instant invention monitors the line-to-line voltages in the order of A to B, B to C, and C to A. During unfaulted operation, the measured voltages are equal, and the polarity conducting circuit 150 outputs consecutive positive waveform values which will be read by the discriminating logic circuit. Each of these non-faulted voltages will be of approximate equal amplitude.

During faulted operation, e.g. diode 180 of the input bridge rectifier circuit fails short circuited, a half wave short circuit will exist from phase A (line $124_A$) to phase B (line $124_B$), and from phase A (line $124_A$) to phase C (line $124_C$). Since the voltage sensing is accomplished using line-to-line voltages of $V_{A-B}$, $V_{B-C}$, and $V_{C-A}$, the $V_{A-B}$ voltage will be only positive going (see FIG. 5) because the negative going voltage, using phase A as the reference, is essentially shorted when the phase B diode 182 is positive biased. The $V_{B-C}$ voltage waveform will maintain both positive and negative going (see FIG. 5) because the fault is not within the path between phase B and phase C. The voltage variation seen in FIG. 5 is caused by the unbalanced loading on the generator. This variation on the voltage amplitude can be neglected. The $V_{C-A}$ voltage waveform will be only negative going (see FIG. 5) because the positive going voltage, using phase C as the reference, is essentially shorted when the phase C diode 184 is positive biased. As described above, these voltages are multiplexer by multiplexer 178 with the output going through the polarity conducting circuit 150 prior to being sensed by the discrimination logic circuit 158. The polarity conducting circuit 150 only allows the positive going voltage to pass. Therefore, when a fault occurs, the discrimination logic circuit 158 will sense two voltages with approximately normal amplitudes and the other voltage with essentially zero amplitude. In this situation, the protection signal on line 160 will be generated and the generator will be de-energized.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A protection circuit for a bridge rectifier having a plurality of ac inputs coupled to a plurality of line voltages, and a dc output, comprising:

means coupled to the line voltages for monitoring said line voltages, said monitoring means generating sequential line-to-line voltage signals thereby;

means coupled to said monitoring means for conducting that portion of each of said sequential line-to-line voltage signals having a given polarity, said conducting means generating sequential half wave voltage signals having a given polarity magnitude; and means coupled to said conducting means for discriminating a faulted rectifier by monitoring said given polarity magnitude of each of said sequential half wave voltage signals, said discriminating means generating a protection signal in response to one of said magnitudes being less than a threshold.

2. The protection circuit of claim 1, wherein said monitoring means comprises a plurality of differential summing amplifiers.

3. The protection circuit of claim 1, wherein said conducting means comprises a plurality of diodes, each of said diodes having an anode and a cathode, and wherein said anodes are coupled to said monitoring means and said cathodes are coupled to said discriminating means.

4. The protection circuit of claim 3, wherein said given polarity is positive.

5. The protection circuit of claim 1, wherein said conducting means comprises at least one ideal diode, said at least one ideal diode comprising an operational amplifier and a diode, and wherein said given polarity is positive.

6. The protection circuit of claim 1, further comprising a multiplexer electrically interposed between said monitoring means and said conducting means, said multiplexer sequentially coupling each of said line-to-line voltage signals to said conducting means.

7. The protection circuit of claim 6, wherein said conducting means comprises a diode having an anode and a cathode, and wherein said anode is coupled to said multiplexer and said cathode is coupled to said discriminating means.

8. An electric power generating system, comprising:

a generator having a poly-phase ac output, said generator being drivably coupled to a prime mover whereby a first poly-phase ac electrical waveform having a frequency component which varies with speed is generated on said poly-phase ac output;

electric power conversion means electrically coupled to said poly-phase output for converting said first poly-phase ac electrical waveform to a second poly-phase ac electrical waveform having a controlled frequency component which may be varied independent of generator speed; and wherein said conversion means comprises an input bridge rectifier means for converting said first waveform into a dc waveform on a dc link, and a switching network means for converting said dc waveform into said second waveform; and wherein said conversion means further comprises means for detecting and isolating a failure in said input bridge rectifier means, said detecting and isolating means de-energizing said generator in response thereto; and wherein said detecting and isolating means comprises:
  means coupled to each phase of said first poly-phase ac waveform for monitoring phase voltages, said monitoring means generating sequential phase-to-phase voltage signals therefrom;
  means coupled to said monitoring means for conducting that portion of each of said sequential phase-to-phase voltage signals having a given polarity, said conducting means generating sequential half wave voltage signals having a given polarity magnitude; and
  means coupled to said conducting means for discriminating a faulted input bridge rectifier means by monitoring said given polarity magnitude of each of said sequential half wave voltage signals, said discriminating means generating a protection signal in response to one of said magnitudes being less than a threshold.

9. The protection circuit of claim 8, wherein said monitoring means comprises a plurality of differential summing amplifiers.

10. The protection circuit of claim 8, wherein said conducting means comprises a plurality of diodes, each of said diodes having an anode and a cathode, and wherein said anodes are coupled to said monitoring means and said cathodes are coupled to said discriminating means.

11. The protection circuit of claim 10, wherein said given polarity is positive.

12. The protection circuit of claim 8, wherein said conducting means comprises at least one ideal diode, said at least one ideal diode comprising an operational amplifier and a diode, and wherein said given polarity is positive.

13. The protection circuit of claim 8, further comprising a multiplexer electrically interposed between said monitoring means and said, conducting means, said multiplexer sequentially coupling each of said phase-to-phase voltage signals to said conducting means.

14. The protection circuit of claim 13, wherein said conducting means comprises a diode having an anode and a cathode, and wherein said anode is coupled to said multiplexer and said cathode is coupled to said discriminating means.

\* \* \* \* \*